United States Patent
Takahira et al.

(10) Patent No.: US 9,756,220 B2
(45) Date of Patent: Sep. 5, 2017

(54) IMAGE DATA GENERATING APPARATUS, PRINTER, IMAGE DATA GENERATING METHOD, AND NON-TRANSITORY COMPUTER READABLE MEDIUM FOR EXTRACTING ONE OR MORE PIXELS CORRESPONDING TO A METALLIC-COLOR REGION

(71) Applicant: FUJI XEROX Co., Ltd., Tokyo (JP)

(72) Inventors: Toshifumi Takahira, Kanagawa (JP); Toru Misaizu, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/045,380

(22) Filed: Feb. 17, 2016

(65) Prior Publication Data
US 2017/0085753 A1   Mar. 23, 2017

(30) Foreign Application Priority Data
Sep. 18, 2015   (JP) .................... 2015-185115

(51) Int. Cl.
*H04N 1/60*   (2006.01)

(52) U.S. Cl.
CPC ... *H04N 1/6002* (2013.01); *H04N 2201/0082* (2013.01)

(58) Field of Classification Search
CPC combination set(s) only.
See application file for complete search history.

(56) References Cited

U.S. PATENT DOCUMENTS 9,384,430 B2 * 7/2016 Shibasaki .............. G06K 15/14

FOREIGN PATENT DOCUMENTS

| JP | 08-187899 A | 7/1996 |
| JP | 10-126631 A | 5/1998 |
| JP | 2009-220423 A | 10/2009 |

* cited by examiner

*Primary Examiner* — Barbara Reinier
(74) *Attorney, Agent, or Firm* — Sughrue Mion, PLLC

(57) ABSTRACT

An image data generating apparatus includes an extracting unit and a generating unit. The extracting unit extracts one or more pixels corresponding to a metallic-color region expressed by a metallic color, by using lightness and saturation of a read image and lightness and saturation of a captured image, the read image being obtained by reading a document having the metallic-color region, the captured image being obtained by capturing an image of the document. The generating unit generates image data in which the one or more pixels corresponding to the metallic-color region and extracted by the extracting unit are colored in the metallic color.

11 Claims, 13 Drawing Sheets

| TYPE OF COLOR | GOLD |
|---|---|
| SOURCE IMAGE | CAPTURED IMAGE |
| PIXEL VALUE | L1, a1, b1 |
| COMPOSITE VALUE | 123 |
| POSITION OF PIXEL | (x1, y1) |

20

IMAGE DATA GENERATING APPARATUS, PRINTER, IMAGE DATA GENERATING METHOD, AND NON-TRANSITORY COMPUTER READABLE MEDIUM FOR EXTRACTING ONE OR MORE PIXELS CORRESPONDING TO A METALLIC-COLOR REGION

CROSS-REFERENCE TO RELATED APPLICATIONS

This application is based on and claims priority under 35 USC 119 from Japanese Patent Application No. 2015-185115 filed Sep. 18, 2015.

BACKGROUND

Technical Field

The present invention relates to an image data generating apparatus, a printer, an image data generating method, and a non-transitory computer readable medium.

SUMMARY

According to an aspect of the invention, there is provided an image data generating apparatus including an extracting unit and a generating unit. The extracting unit extracts one or more pixels corresponding to a metallic-color region expressed by a metallic color, by using lightness and saturation of a read image and lightness and saturation of a captured image, the read image being obtained by reading a document having the metallic-color region, the captured image being obtained by capturing an image of the document. The generating unit generates image data in which the one or more pixels corresponding to the metallic-color region and extracted by the extracting unit are colored in the metallic color.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described in detail with reference to the attached drawings.

First Exemplary Embodiment

First, an image data generating apparatus according to a first exemplary embodiment will be described.

A user may want to create, by using a printer, a duplicate of a document having a metallic-color region that is expressed by a metallic color by using ink of a metallic color such as gold or silver, gold foil, or the like. In such a case, a typical printer extracts or more pixels corresponding to the metallic-color region on the basis of the pixels designated by the user with reference to the document, and generates metallic-color image data. Also, the printer creates a plate for the metallic color on the basis of the generated image data, and performs printing by using the created plate and toner of the metallic-color toner. However, in the case of generating metallic-color image data, it is necessary for the user to designate one or more pixels corresponding to the metallic-color region with reference to the document, which is inconvenient to the user.

In a case where a document is irradiated with light under plural different irradiation conditions, a light reflection state greatly varies according to an irradiation condition in a metallic-color region, compared to a region other than the metallic-color region. Thus, with plural images obtained under different irradiation conditions for a document being compared to one another, it is possible to determine whether or not each region of the document is a metallic-color region.

The image data generating apparatus according to this exemplary embodiment extracts one or more pixels corresponding to a metallic-color region by using lightness and saturation of a read image, which is obtained by reading a document having the metallic-color region, and lightness and saturation of a captured image, which is obtained by capturing an image of the document. Also, the image data generating apparatus according to this exemplary embodiment generates image data in which the extracted pixels corresponding to the metallic-color region are metallic-colored. Further, a printer including the image data generating apparatus according to this exemplary embodiment creates a plate for the metallic color on the basis of the generated image data, and prints, in the metallic color, an image drawn in the metallic color in the document by using the created plate.

Figure 1:
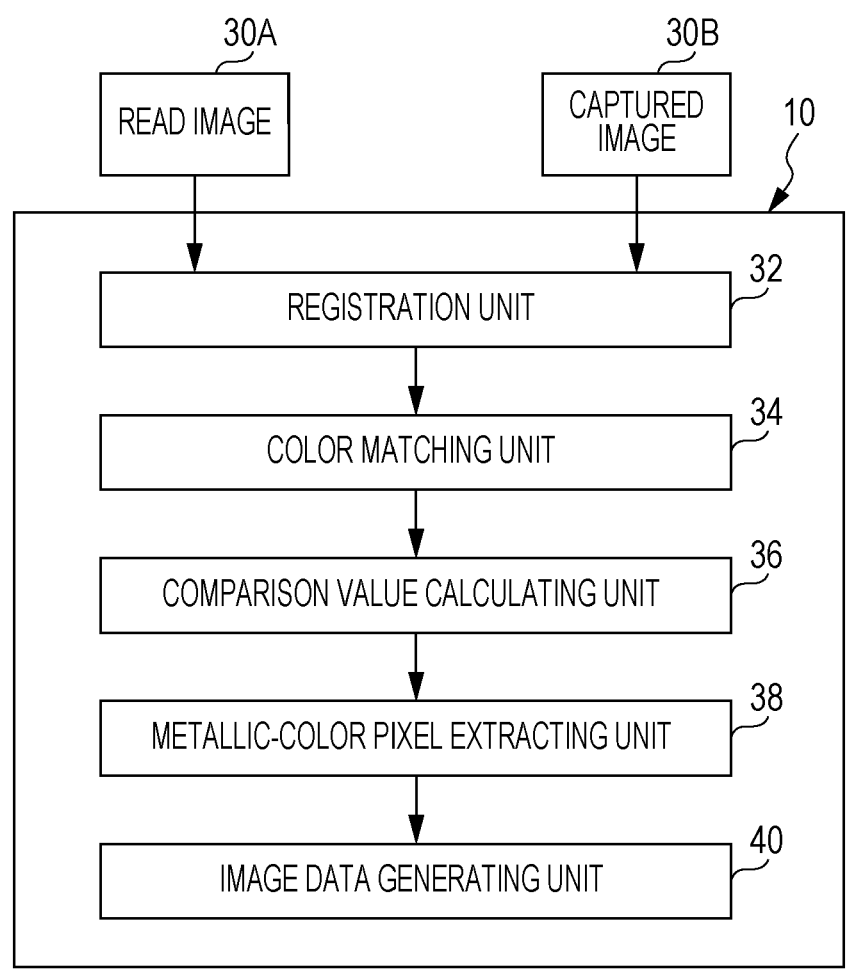
FIG. 1 is a block diagram illustrating a functional configuration of an image data generating apparatus according to a first exemplary embodiment.

As illustrated in FIG. 1, an image data generating apparatus 10 according to this exemplary embodiment includes a registration unit 32, a color matching unit 34, a comparison value calculating unit 36, a metallic-color pixel extracting unit 38, and an image data generating unit 40.

The registration unit 32 obtains a read image 30A and a captured image 30B, which are images of the same document having a metallic-color region expressed by a metallic color and which have been obtained under different light irradiation conditions.

Figure 2A:
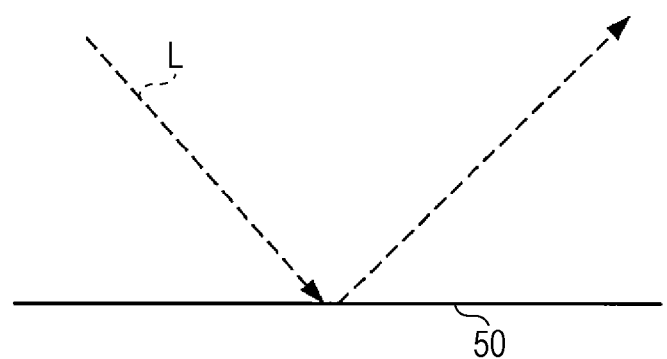
FIG. 2A is a schematic diagram illustrating an example of a method for obtaining a read image according to the first exemplary embodiment.
Figure 3:
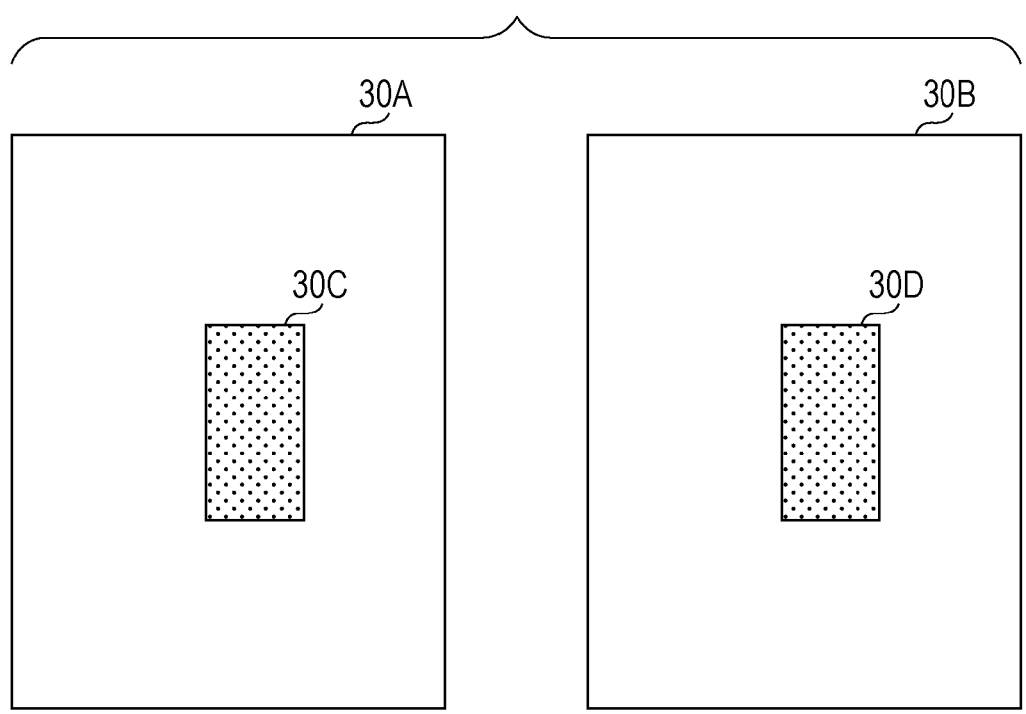
FIG. 3 is a schematic diagram illustrating an example of a read image and captured image according to the first exemplary embodiment.

The read image 30A is, as illustrated in FIG. 2A as an example, an image obtained by reading a document 50 by using a scanner having a lens with a fixed angle and a light beam L applied at a fixed angle. The read image 30A has, as illustrated in FIG. 3 as an example, a metallic-color region 30C corresponding to the metallic-color region of the document. In this way, the read image 30A obtained by reading the document 50 by a scanner is used in this exemplary embodiment, but the type of image to be used is not limited thereto. That is, any image obtained by an apparatus other than a scanner may be used as long as the image is read from the document 50 by using a light beam applied at a fixed angle and a lens with a fixed angle.

Figure 2B:
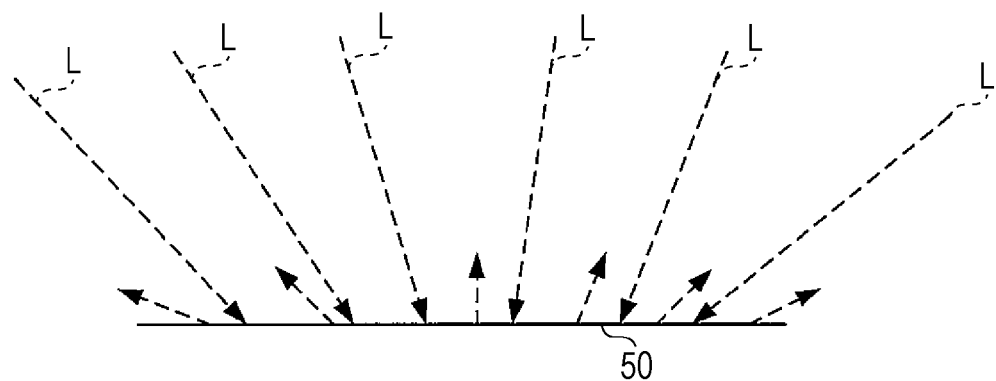
FIG. 2B is a schematic diagram illustrating an example of a method for obtaining a captured image according to the first exemplary embodiment.

The captured image 30B is, as illustrated in FIG. 2B as an example, an image obtained by capturing an image of the document 50 by using light beams L applied at plural different angles and a lens with a fixed angle. The captured image 30B has, as illustrated in FIG. 3 as an example, a metallic-color region 30D corresponding to the metallic-color region of the document. In this way, the captured image 30B obtained by capturing an image of the document 50 by a camera is used in this exemplary embodiment, but the type of image to be used is not limited thereto. That is, any image obtained by an apparatus other than a camera may be used as long as the image is obtained by capturing an image of the document 50 in an environment in which light beams L come from the surroundings.

The registration unit 32 performs registration between subjects drawn in the read image 30A and the captured image 30B that have been read. For registration, a registration method according to the related art that is generally used in image processing, such as pattern matching, may be used. To perform registration with high accuracy, a marker may be formed on each of the read image 30A and the captured image 30B in advance, and registration may be performed by using the markers.

The color matching unit 34 performs color matching between the read image 30A and the captured image 30B. As a color matching method, a method generally used in image processing, such as the methods described in the following specific examples (1) to (3), may be used.

(1) Correction of white and range correction of white and black are performed from a color close to paper white and black.

(2) A patch chart of paper white, black, cyan, magenta, yellow, and so forth is created in advance, and correction is performed so that the same patch values are obtained in each of the read image 30A and the captured image 30B.

(3) Under the same environment as the environment in which the read image 30A is obtained, a patch chart for creating a color profile is created in advance, and the color profile for correcting the read image 30A is created in advance. Also, under the same environment as the environment in which the captured image 30B is obtained, a patch chart for creating a color profile is created in advance, and the color profile for correcting the captured image 30B is created in advance. The read image 30A and the captured image 30B are corrected by using the respective color profiles, and thereby color matching is performed so that the read image 30A and the captured image 30B have the same colors.

If a metallic-color region is recognized at the time when color matching between the read image 30A and the captured image 30B is performed, color matching may be performed by using only a region of a color other than the metallic color.

The comparison value calculating unit 36 converts RGB values of the read image 30A and the captured image 30B into HLS values, and calculates, for each pair of pixels corresponding to each other, a comparison value between the read image 30A and the captured image 30B by using the color profiles. Specifically, the comparison value calculating unit 36 calculates, as expressed by the following equation (1), a lightness difference $\Delta L$ between a lightness value Ls of the read image 30A and a lightness value Lc of the captured image 30B from the pixel values of individual pixels of the read image 30A and the captured image 30B. Also, the comparison value calculating unit 36 calculates, as expressed by the following equation (2), a saturation difference $\Delta S$ between a saturation value Ss of the read image 30A and a saturation value Sc of the captured image 30B.

$$\Delta L = Ls - Lc \qquad (1)$$

$$\Delta S = Ss - Sc \qquad (2)$$

Further, the comparison value calculating unit 36 calculates, as expressed by the following equation (3), a composite value $\Delta LS$ representing the length of a composite vector of the vector of the lightness difference $\Delta L$ and the vector of the saturation difference $\Delta S$. The composite value $\Delta LS$ represents a difference in distance between lightness and saturation.

$$\Delta LS = \sqrt{\Delta L^2 + \Delta S^2} \qquad (3)$$

In this exemplary embodiment, the comparison between the read image 30A and the captured image 30B is performed by using an HLS value, as described above. Alternatively, the comparison may be performed by using a value of L*a*b*. In this case, the comparison value calculating unit 36 converts the RGB values of the read image 30A and the captured image 30B into L*a*b*, applies L* to a lightness value, and applies C* calculated by using the following equation (4) to a saturation value.

$$C^* = \sqrt{a^{*2} + b^{*2}} \qquad (4)$$

In the case of performing comparison by using L*a*b*, the comparison value calculating unit 36 calculates a composite value of a lightness value L* and a saturation value C* corresponding to the above-described composite value $\Delta LS$ by using a difference $\Delta L^*$ in L* and a difference $\Delta C^*$ in C* between the read image 30A and the captured image 30B, as expressed by the following equation (5).

$$\Delta LS = \sqrt{\Delta L^{*2} + \Delta C^{*2}} \quad (5)$$

By using lightness differences ΔL and saturation differences ΔS calculated for individual pairs of pixels, the metallic-color pixel extracting unit 38 determines that the pixels corresponding to each other in the read image 30A and the captured image 30B are pixels corresponding to the metallic-color region of the document if all the following conditions (A) to (C) are satisfied.

(A) The read image 30A has lower lightness (is darker) than the captured image 30B.

(B) The read image 30A has lower saturation (is closer to gray) than the captured image 30B.

(C) The composite value ΔLS is equal to or larger than a predetermined threshold α, which is a reference for determining whether or not the color is a metallic color.

In this exemplary embodiment, a composite value ΔLS of pixels corresponding to a metallic-color region and a composite value ΔLS of pixels corresponding to a region other than the metallic-color region are calculated in advance through an experiment by using plural documents in which a metallic-color region is recognized in advance. On the basis of the calculated composite values ΔLS, a threshold α of a composite value ΔLS for determining whether or not a pixel corresponds to the metallic-color region is determined and is stored in a nonvolatile memory 20 in advance. In the case of extracting pixels of plural colors corresponding to a metallic-color region of plural metallic colors, a threshold α is determined for each of the metallic colors, and the determined thresholds α are stored in the nonvolatile memory 20 in advance.

In the case of determining, for each pixel, whether or not the pixel is a metallic color, a threshold may be set for the lightness difference ΔL. For example, it may be determined that the read image 30A has lower lightness and the lightness difference ΔL is equal to or larger than the predetermined threshold. Likewise, in the case of determining, for each pixel, whether or not the pixel is a metallic color, a threshold may be set for the saturation difference ΔS. For example, it may be determined that the read image 30A has lower saturation and the saturation difference ΔS is equal to or larger than the predetermined threshold.

In the case of calculating a composite value ΔLS, for example, at least one of the lightness difference and saturation difference may be multiplied by a coefficient so as to change the gravity of the lightness difference and saturation difference.

The metallic-color pixel extracting unit 38 extracts, on the basis of the lightness difference between the read image 30A and the captured image 30B and the saturation difference between the read image 30A and the captured image 30B, a pixel that has been determined to be a pixel corresponding to the metallic-color region included in the document.

The image data generating unit 40 generates image data in which one or more extracted pixels corresponding to the metallic-color region are metallic-colored. In a case where the document has a metallic-color region of plural colors, the image data generating unit 40 generates image data for each color of the metallic-color region. The generated image data is output to a printer. The printer creates a plate for the metallic color on the basis of the output image data, and prints, in the metallic color, an image drawn in the metallic color in the document by using the created plate.

The registration unit 32, the color matching unit 34, the comparison value calculating unit 36, and the metallic-color pixel extracting unit 38 correspond to an example of an extracting unit. The image data generating unit 40 is an example of a generating unit.

Figure 4:
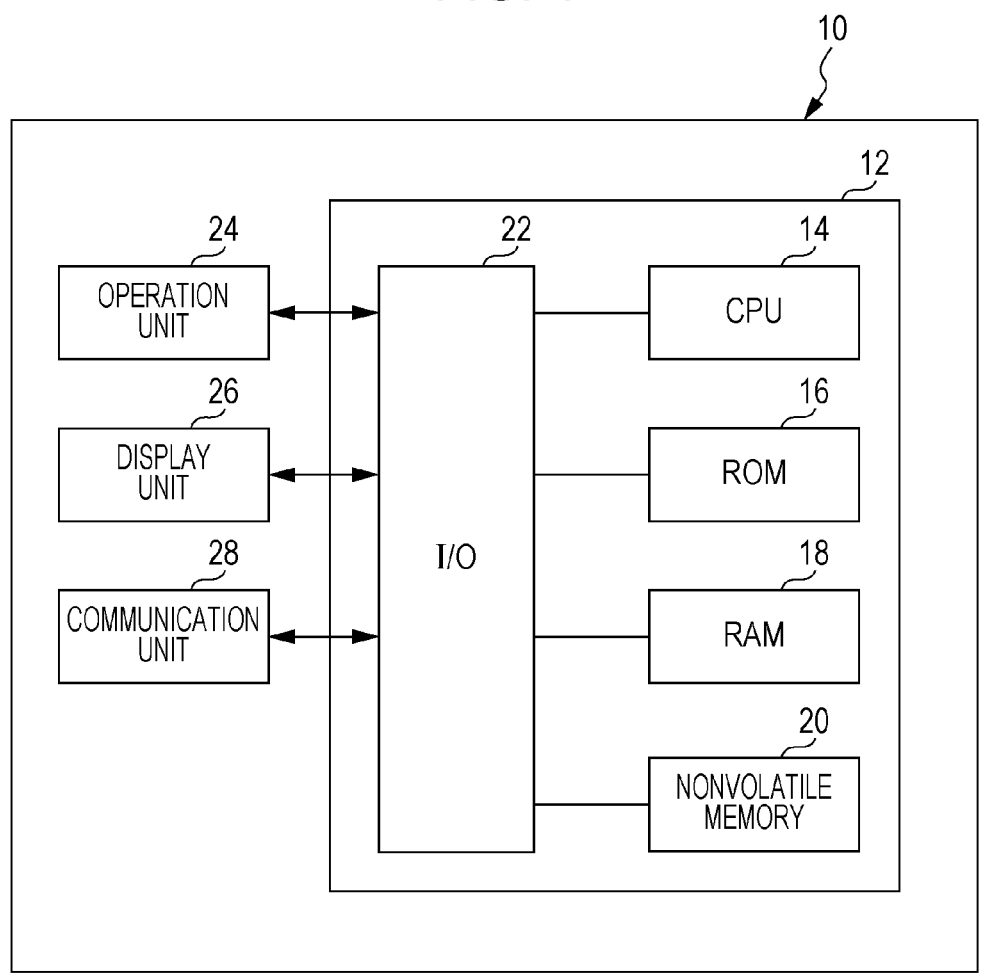
FIG. 4 is a block diagram illustrating an electrical configuration of the image data generating apparatus according to the first exemplary embodiment.

As illustrated in FIG. 4, the image data generating apparatus 10 may include a controller 12 that controls the entire apparatus. The controller 12 includes a central processing unit (CPU) 14 that executes various processes including an image data generation process which will be described below, and a read only memory (ROM) 16 that stores programs and various pieces of information used for the processes performed by the CPU 14. Also, the controller 12 includes a random access memory (RAM) 18 that serves as a working area of the CPU 14 and temporarily stores various pieces of data, and the nonvolatile memory 20 that stores various pieces of information used for the processes performed by the CPU 14. Further, the controller 12 includes an input/output (I/O) interface 22 that receives data from and outputs data to an external apparatus connected to the image data generating apparatus 10.

The I/O interface 22 is connected to an operation unit 24 that is operated by a user, a display unit 26 that displays various pieces of information, and a communication unit 28 that communicates with an external apparatus including an external server.

The processes executed by the individual units of the image data generating apparatus 10 are executed by the CPU 14 in accordance with various programs. In this exemplary embodiment, the various programs are stored in the nonvolatile memory 20 included in the image data generating apparatus 10. However, the storage site of the various programs is not limited thereto, and the various programs may be stored in a recording medium such as a magnetic disk or an optical disc, or may be provided via the communication unit 28. Further, any other elements are not necessarily implemented by a single computer or server, and may be implemented by plural computers connected through a network in a distributed manner.

Figure 5:
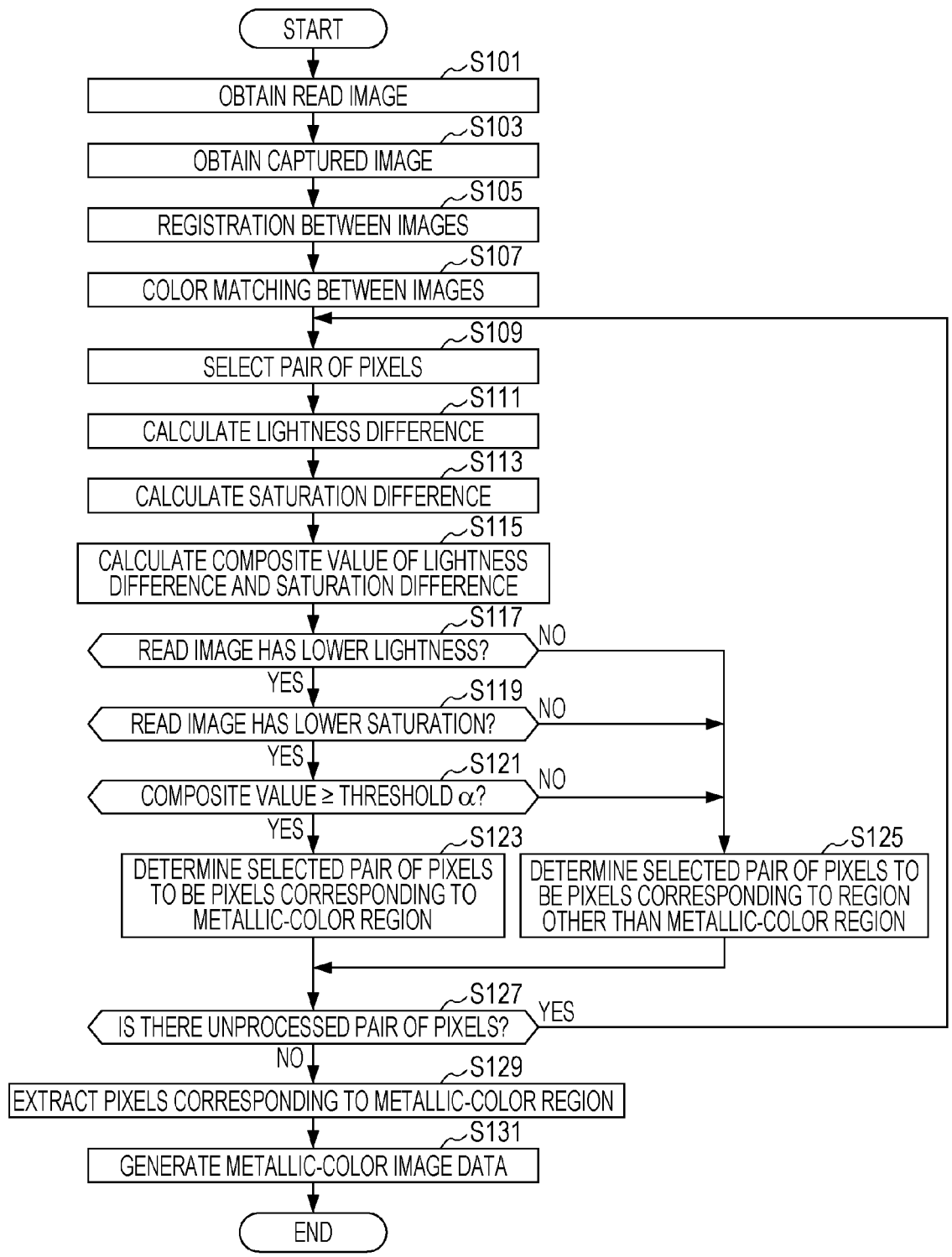
FIG. 5 is a flowchart illustrating a flow of a program of an image data generation process according to the first exemplary embodiment.

Next, a description will be given of a flow of an image data generation process executed by the CPU 14 of the image data generating apparatus 10 according to this exemplary embodiment with reference to the flowchart illustrated in FIG. 5. In this exemplary embodiment, the program of the image data generation process is executed when an execution instruction is input through the operation unit 24, but the execution timing is not limited thereto.

In step S101, the registration unit 32 obtains the read image 30A. In this exemplary embodiment, the registration unit 32 obtains the read image 30A from an external apparatus connected to the communication unit 28, but the obtainment method is not limited thereto. For example, the registration unit 32 may obtain the read image 30A that has been read by a scanner connected to the I/O interface 22 from the scanner.

In step S103, the registration unit 32 obtains the captured image 30B. In this exemplary embodiment, the registration unit 32 obtains the captured image 30B from an external apparatus connected to the communication unit 28, but the obtainment method is not limited thereto. For example, the registration unit 32 may obtain the captured image 30B that has been captured by an image capturing apparatus connected to the I/O interface 22 from the image capturing apparatus.

In step S105, the registration unit 32 performs registration between the read image 30A and the captured image 30B.

In step S107, the color matching unit 34 performs color matching between the read image 30A and the captured image 30B.

In step S109, the comparison value calculating unit 36 selects a pair of pixels corresponding to each other from the read image 30A and the captured image 30B. In this exemplary embodiment, pairs of pixels are sequentially selected one by one starting from the pair of pixels at the upper left of the read image 30A and the captured image 30B.

In step S111, the comparison value calculating unit 36 calculates a lightness difference ΔL in the pair of pixels selected in step S109 between the read image 30A and the captured image 30B.

In step S113, the comparison value calculating unit 36 calculates a saturation difference ΔS in the pair of pixels selected in step S109 between the read image 30A and the captured image 30B.

In step S115, the comparison value calculating unit 36 calculates a composite value ΔLS of the lightness difference ΔL and the saturation difference ΔS in the pair of pixels selected in step S109 between the read image 30A and the captured image 30B.

In step S117, the comparison value calculating unit 36 determines whether or not the read image 30A has lower lightness (is darker) than the captured image 30B. If it is determined in step S117 that the read image 30A has lower lightness than the captured image 30B (YES in S117), the process proceeds to step S119. If it is determined in step S117 that the captured image 30B has lower lightness than the read image 30A (NO in S117), the process proceeds to step S125.

In step S119, the comparison value calculating unit 36 determines whether or not the read image 30A has lower saturation (is closer to gray) than the captured image 30B. If it is determined in step S119 that the read image 30A has lower saturation than the captured image 30B (YES in S119), the process proceeds to step S121. If it is determined in step S119 that the captured image 30B has lower saturation than the read image 30A (NO in S119), the process proceeds to step S125.

In step S121, the comparison value calculating unit 36 determines whether or not the composite value ΔLS of the pair of pixels selected in step S109 between the read image 30A and the captured image 30B is equal to or larger than the predetermined threshold α. If it is determined in step S121 that the composite value ΔLS is equal to or larger than the predetermined threshold α (YES in S121), the process proceeds to step S123. If it is determined in step S121 that the composite value ΔLS is smaller than the predetermined threshold α (NO in S121), the process proceeds to step S125.

In step S123, the comparison value calculating unit 36 determines the pair of pixels selected in step S109 to be pixels corresponding to the metallic-color region.

In step S125, the comparison value calculating unit 36 determines the pair of pixels selected in step S109 to be pixels corresponding to a region other than the metallic-color region.

In step S127, the comparison value calculating unit 36 determines whether or not there is an unprocessed pair of pixels, that is, a pair of pixels that is not selected in step S109, among the pairs of pixels of the read image 30A and the captured image 30B. If it is determined in step S127 that there is an unprocessed pair of pixels (YES in S127), the process returns to step S109, where an unprocessed pair of pixels is selected, and the process from step S109 to step S125 is performed. If it is determined in step S127 that there is not an unprocessed pair of pixels (NO in S127), the process proceeds to step S129.

In step S129, the metallic-color pixel extracting unit 38 extracts, from the read image 30A and the captured image 30B, the pixels that have been determined to be pixels corresponding to the metallic-color region.

In step S131, the image data generating unit 40 generates metallic-color image data.

In this way, in this exemplary embodiment, one or more pixels corresponding to a metallic-color region are extracted by using lightness and saturation of the read image 30A, which is obtained by reading a document having a metallic-color region expressed by a metallic color, and lightness and saturation of the captured image 30B, which is obtained by capturing an image of the document. Also, with use of the extracted pixels corresponding to the metallic-color region, image data is generated in which the pixels corresponding to the metallic-color region are metallic-colored.

If the image data generating apparatus 10 outputs, to a printer, image data of an image drawn in a metallic color in a document, the printer creates a plate for the metallic color on the basis of the image data.

Figure 6:
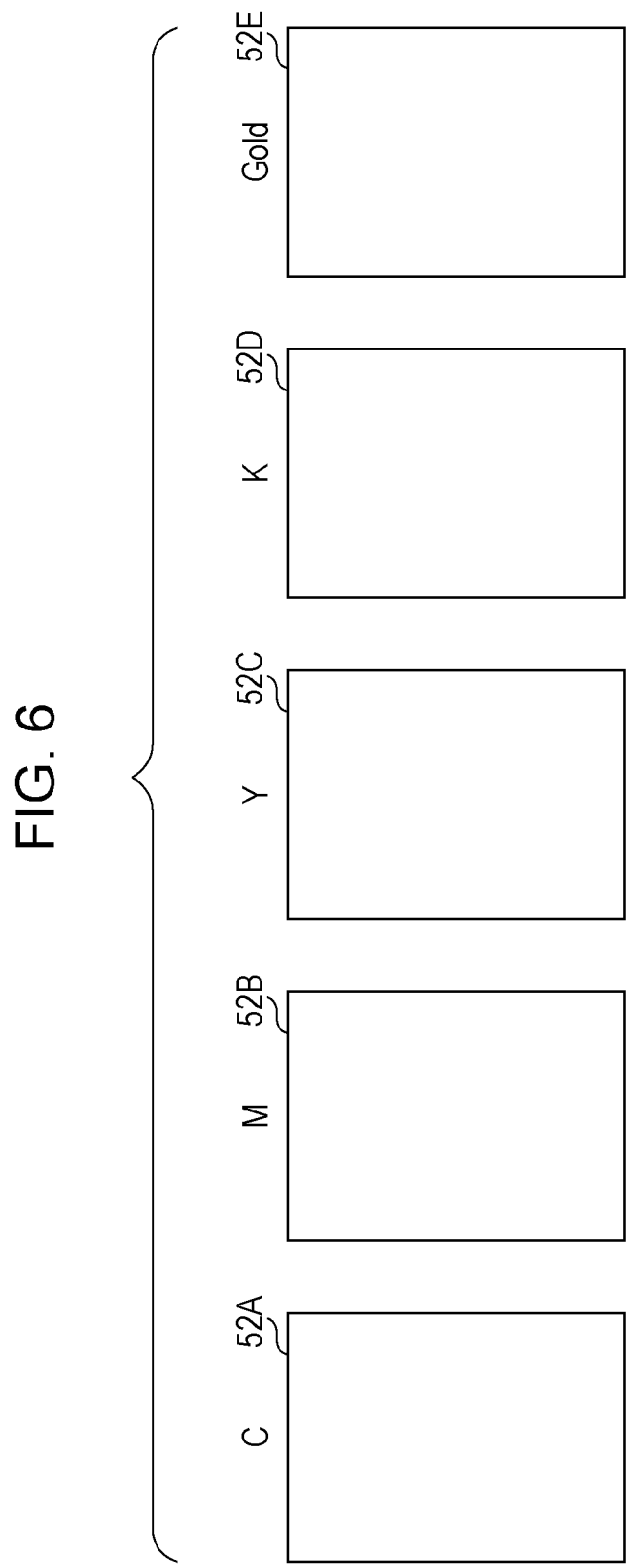
FIG. 6 is a schematic diagram illustrating an example of plates of individual colors created based on image data that is generated by the image data generating apparatus according to the first exemplary embodiment.

The image data generating apparatus 10 may be incorporated in the printer. In this case, the printer including the image data generating apparatus 10 incorporated therein generates image data of a metallic-color region of a document and creates a plate for the metallic color on the basis of the generated image data. That is, as illustrated in FIG. 6 as an example, plates for individual colors such as a cyan (C) plate 52A, a magenta (M) plate 52B, an yellow (Y) plate 52C, and a black (K) plate 52D are created to perform printing in the printer. At this time, a plate for a metallic color, such as a gold plate 52E, is also created.

Second Exemplary Embodiment

Next, an image data generating apparatus according to a second exemplary embodiment will be described.

In the first exemplary embodiment, a description has been given of the case of extracting one or more pixels corresponding to a metallic-color region by using a lightness difference and a saturation difference between the read image 30A and the captured image 30B. In the second exemplary embodiment, a description will be given of the case of extracting one or more pixels corresponding to a metallic-color region by using a lightness difference and a saturation difference between the read image 30A and the captured image 30B and a metallic color designated by a user.

Figure 7:
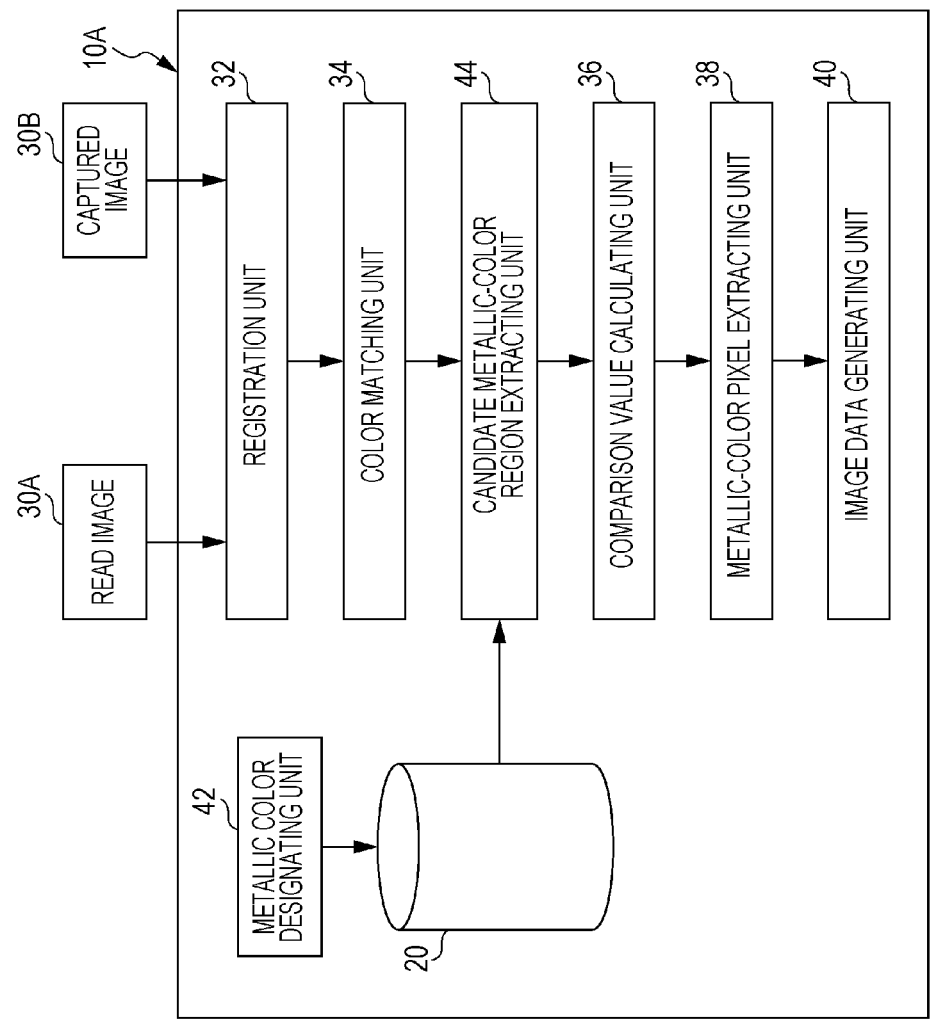
FIG. 7 is a block diagram illustrating a functional configuration of an image data generating apparatus according to second and third exemplary embodiments.

An image data generating apparatus 10A according to the second exemplary embodiment includes, as illustrated in FIG. 7, a metallic color designating unit 42 and a candidate metallic-color region extracting unit 44.

Figure 8:
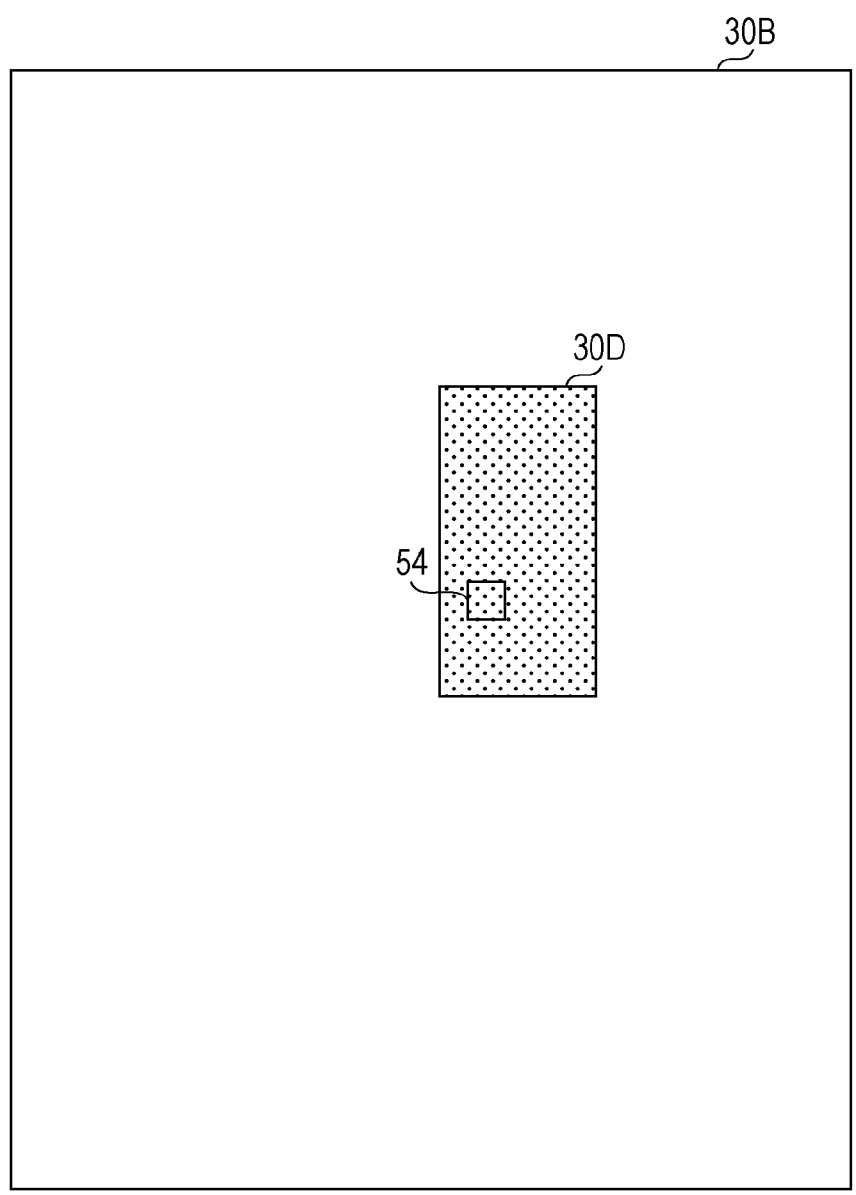
FIG. 8 is a schematic diagram illustrating an example of a candidate metallic-color region designated in at least one of a read image and a captured image according to the second exemplary embodiment.

The metallic color designating unit 42 designates a metallic-color region in either of the read image 30A and the captured image 30B. In this exemplary embodiment, as illustrated in FIG. 8 as an example, the metallic color designating unit 42 causes the display unit 26 to display either of the read image 30A and the captured image 30B and causes a user to operate the operation unit 24 to select a region 54, which is a part of the displayed image, as a metallic-color region. The selected region 54 may be formed of one or more pixels. Subsequently, the metallic color designating unit 42 generates metallic-color information from a pixel value or pixel values of the pixel or pixels included in the region 54, and stores the generated metallic-color information in the nonvolatile memory 20.

Figures 9, 10:
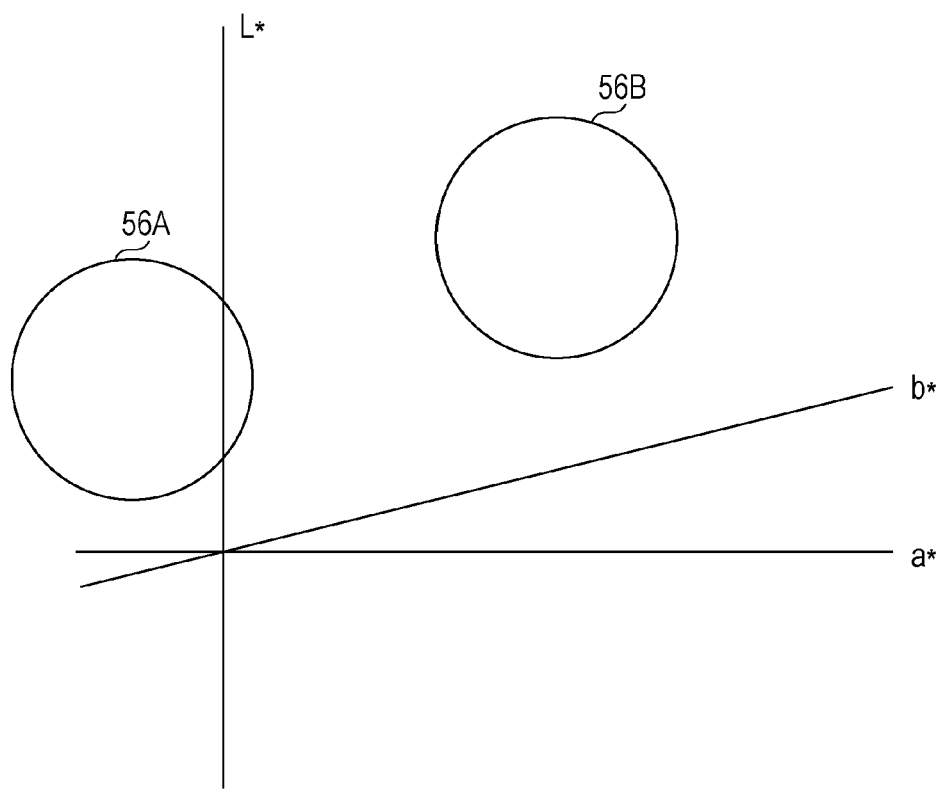
FIG. 9 is a schematic diagram illustrating an example of metallic-color information according to the second exemplary embodiment.
FIG. 10 is a schematic diagram illustrating an example of ranges of a metallic color in a color space designated by the image data generating apparatus according to the second exemplary embodiment.

As the metallic-color information, as illustrated in FIG. 9 as an example, the type of color, such as gold, silver, or copper; a source image, such as the read image 30A or the captured image 30B; a pixel value; a composite value ΔLS;

and the position of a designated pixel are stored for each color in association with one another. The composite value ΔLS is not necessarily stored. In a case where the composite value ΔLS is not stored, the range of the composite value ΔLS may be the above-described threshold α or more, for example.

In this exemplary embodiment, a metallic-color region is designated in either of the read image 30A and the captured image 30B, but the designation method is not limited thereto. For example, a metallic-color region may be designated in an image different from the read image 30A and the captured image 30B. Also, the individual items of metallic-color information may be directly input by the user by operating the operation unit 24. Alternatively, the individual items of metallic-color information may be obtained from an external apparatus via the communication unit 28.

In this exemplary embodiment, as illustrated in FIG. 10 as an example, the pixels whose pixel value is within a predetermined range 56A around the pixel value of a designated metallic color A in the L*a*b* space are associated with one another by using a clustering technique according to the related art. The pixels associated with one another within the range 56A are regarded as pixels of the metallic color A. Likewise, the pixels whose pixel value is within a predetermined range 56B around the pixel value of a designated metallic color B in the L*a*b* space are associated with one another by using the clustering technique according to the related art. The pixels associated with one another within the range 56B are regarded as pixels of the metallic color B.

Figure 11:
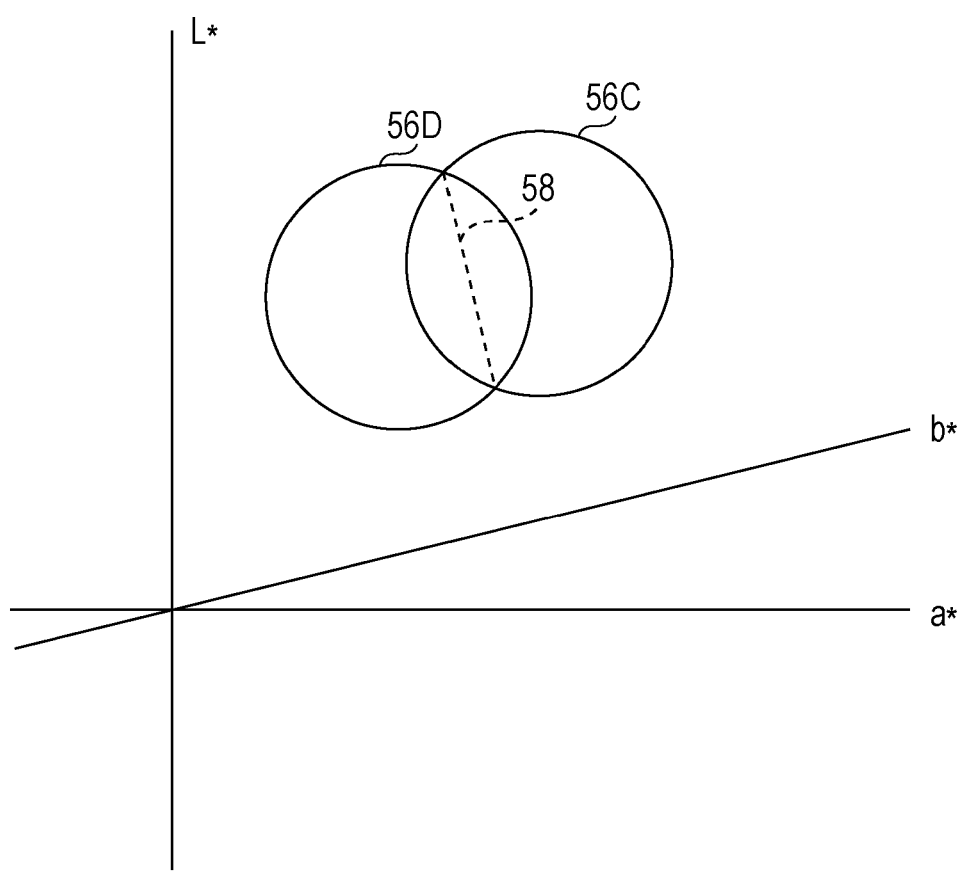
FIG. 11 is a schematic diagram illustrating another example of ranges of a metallic color in a color space designated by the image data generating apparatus according to the second exemplary embodiment.

In a case where plural metallic colors are designated and the ranges of the individual colors are mutually overlapped in the color space, the metallic-color region is divided at the center of the overlapped ranges into the ranges of individual colors. As illustrated in FIG. 11 as an example, in a case where a range 56C of a metallic color C and a range 56D of a metallic color D are overlapped with each other, the metallic-color region is divided at a center 58 of the ranges 56C and 56D into the range of the metallic color C and the range of the metallic color D.

In the case of designating the range of the composite value ΔLS, an instruction to widen or narrow the range of the same metallic color from a predetermined size of range may be input. Alternatively, a certain distance including a designated pixel in the color space (for example, a three-dimensional distance ΔE in the Lab space) may be input, and the range defined by the certain distance around the pixel value of the designated pixel may be regarded as the range of the pixel value of a pixel corresponding to the designated metallic-color region.

The candidate metallic-color region extracting unit 44 obtains metallic-color information from the nonvolatile memory 20 and extracts one or more pixels whose pixel value is within the range of the pixel value of the metallic-color pixel. In a case where there are plural metallic colors, one or more pixels whose pixel value is within the range of a pixel value of a pixel corresponding to the metallic-color region are extracted for each color.

The configuration of the other part of the image data generating apparatus 10A according to the second exemplary embodiment is the same as that of the image data generating apparatus 10 according to the first exemplary embodiment, and thus the description thereof is omitted.

The registration unit 32, the color matching unit 34, the comparison value calculating unit 36, the metallic-color pixel extracting unit 38, the metallic color designating unit 42, and the candidate metallic-color region extracting unit 44 correspond to an example of the extracting unit. The image data generating unit 40 is an example of the generating unit.

Figure 12:
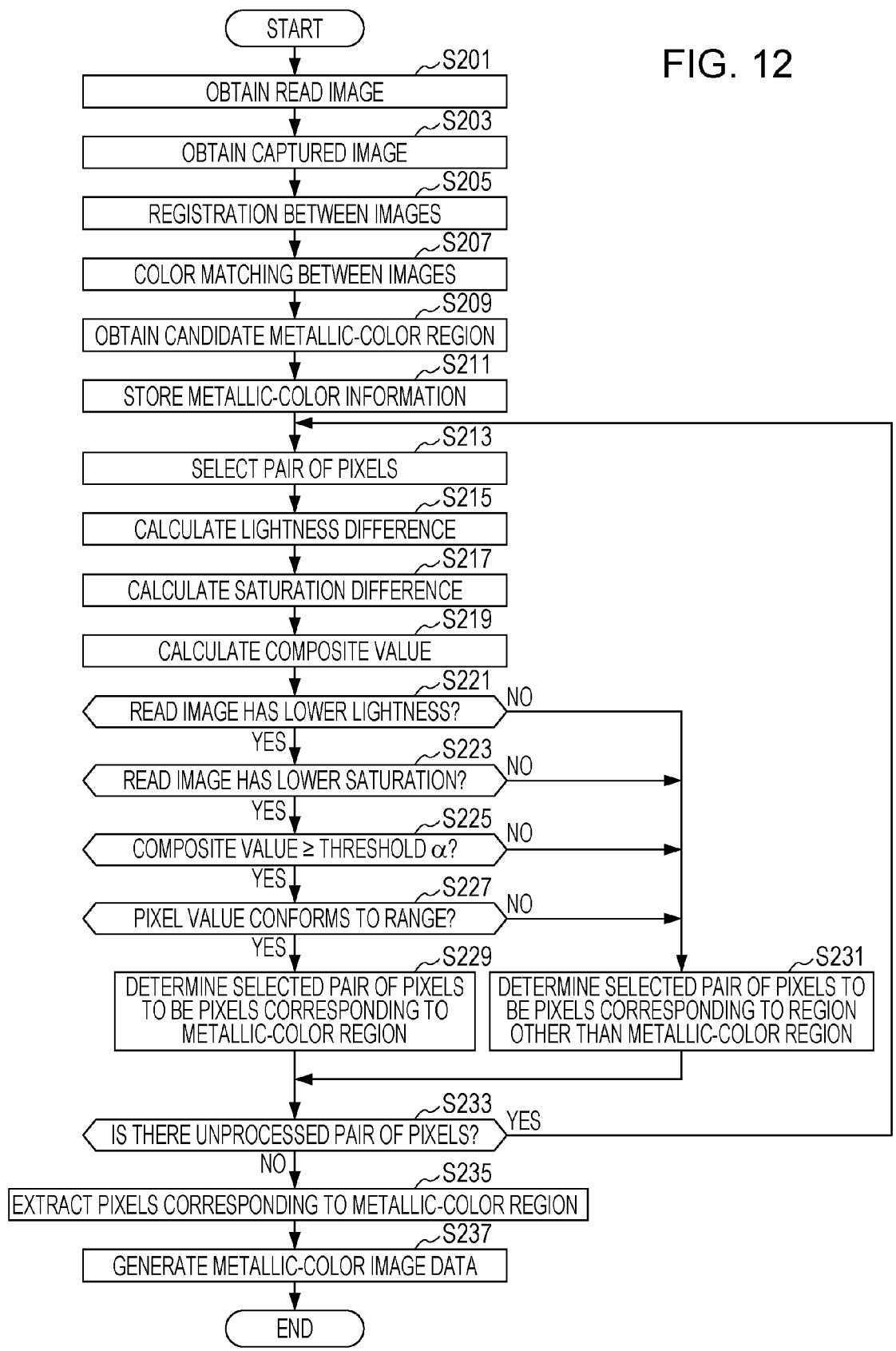
FIG. 12 is a flowchart illustrating a flow of a program of an image data generation process according to the second exemplary embodiment.

Next, a description will be given of a flow of an image data generation process executed by the CPU 14 of the image data generating apparatus 10A according to this exemplary embodiment with reference to the flowchart illustrated in FIG. 12. In this exemplary embodiment, the program of the image data generation process is executed when an execution instruction is input through the operation unit 24, but the execution timing is not limited thereto.

In step S201, as in step S101, the registration unit 32 obtains the read image 30A.

In step S203, as in step S103, the registration unit 32 obtains the captured image 30B.

In step S205, as in step S105, the registration unit 32 performs registration between the read image 30A and the captured image 30B.

In step S207, as in step S107, the color matching unit 34 performs color matching between the read image 30A and the captured image 30B.

In step S209, the candidate metallic-color region extracting unit 44 obtains a candidate metallic-color region designated by the user through the operation unit 24.

In step S211, the metallic color designating unit 42 generates metallic-color information from the candidate metallic-color region and stores the generated metallic-color information in the nonvolatile memory 20. In a case where one pixel is designated as a candidate metallic-color region, metallic-color information is generated from the pixel value of the designated pixel. In a case where plural pixels are designated as a candidate metallic-color region, metallic-color information is generated from an average value of the pixel values of the designated pixels. In this exemplary embodiment, the metallic color designating unit 42 prompts the user to input the type of metallic color and a composite value ΔLS. The metallic color designating unit 42 stores, as metallic-color information, the input type of metallic color and composite value ΔLS in the nonvolatile memory 20 in association with the pixel value of the designated pixel, the source document, and the position of the pixel.

In step S213, as in step S109, the comparison value calculating unit 36 selects a pair of pixels corresponding to each other from the read image 30A and the captured image 30B.

In step S215, as in step S111, the comparison value calculating unit 36 calculates a lightness difference ΔL in the pair of pixels selected in step S213 between the read image 30A and the captured image 30B.

In step S217, as in step S113, the comparison value calculating unit 36 calculates a saturation difference ΔS in the pair of pixels selected in step S213 between the read image 30A and the captured image 30B.

In step S219, as in step S115, the comparison value calculating unit 36 calculates a composite value ΔLS of the lightness difference ΔL and the saturation difference ΔS in the pair of pixels selected in step S213 between the read image 30A and the captured image 30B.

In step S221, as in step S117, the comparison value calculating unit 36 determines whether or not the read image 30A has lower lightness than the captured image 30B. If it is determined in step S221 that the read image 30A has lower lightness than the captured image 30B (YES in S221), the process proceeds to step S223. If it is determined in step S221 that the captured image 30B has lower lightness than the read image 30A (NO in S221), the process proceeds to step S231.

In step S223, as in step S119, the comparison value calculating unit 36 determines whether or not the read image 30A has lower saturation than the captured image 30B. If it is determined in step S223 that the read image 30A has lower saturation than the captured image 30B (YES in S223), the process proceeds to step S225. If it is determined in step S223 that the captured image 30B has lower saturation than the read image 30A (NO in S223), the process proceeds to step S231.

In step S225, as in step S121, the comparison value calculating unit 36 determines whether or not the composite value ΔLS of the lightness difference and the saturation difference in the pair of pixels selected in step S213 between the read image 30A and the captured image 30B is equal to or larger than the predetermined threshold α. If it is determined in step S225 that the composite value ΔLS is equal to or larger than the predetermined threshold α (YES in S225), the process proceeds to step S227. If it is determined in step S225 that the composite value ΔLS is smaller than the predetermined threshold α (NO in S225), the process proceeds to step S231.

In step S227, the comparison value calculating unit 36 determines whether or not the pixel values of the pair of pixels selected in step S213 conform to the range of a pixel value included in the metallic-color information stored in step S211. In this exemplary embodiment, if the pixel values of the pair of pixels selected in step S213 are within the range of a pixel value included in the metallic-color information stored in step S211, it is determined that the pixel values conform. If it is determined in step S227 that the pixel values of the selected pair of pixels conform to the range of a pixel value included in the metallic-color information (YES in S227), the process proceeds to step S229. If it is determined in step S227 that the pixel values of the selected pair of pixels do not conform to the range of a pixel value included in the metallic-color information (NO in S227), the process proceeds to step S231.

In step S229, as in step S123, the comparison value calculating unit 36 determines the pair of pixels selected in step S213 to be pixels corresponding to the metallic-color region.

In step S231, as in step S125, the comparison value calculating unit 36 determines the pair of pixels selected in step S213 to be pixels corresponding to a region other than the metallic-color region.

In step S233, as in step S127, the comparison value calculating unit 36 determines whether or not there is an unprocessed pair of pixels, that is, a pair of pixels that is not selected in step S213, among the pairs of pixels of the read image 30A and the captured image 30B. If it is determined in step S233 that there is an unprocessed pair of pixels (YES in S233), the process returns to step S213, where an unprocessed pair of pixels is selected, and the process from step S215 to step S231 is performed. If it is determined in step S233 that there is not an unprocessed pair of pixels (NO in S233), the process proceeds to step S235.

In step S235, as in step S129, the metallic-color pixel extracting unit 38 extracts, from the read image 30A and the captured image 30B, the pixels that have been determined to be pixels corresponding to the metallic-color region.

In step S237, as in step S131, the image data generating unit 40 generates metallic-color image data.

In this way, in this exemplary embodiment, one or more pixels corresponding to a metallic-color region are extracted by using lightness and saturation of the pixels corresponding to the metallic-color region designated in either of the read image 30A and the captured image 30B.

Third Exemplary Embodiment

Next, an image data generating apparatus according to a third exemplary embodiment will be described.

In the second exemplary embodiment, a description has been given of the case of extracting one or more pixels corresponding to a metallic-color region by using a lightness difference and a saturation difference between the read image 30A and the captured image 30B and metallic-color information designated by a user. In the third exemplary embodiment, a description will be given of the case of extracting one or more pixels corresponding to a metallic-color region by using a lightness difference and a saturation difference between the read image 30A and the captured image 30B and a candidate metallic-color region designated by a user.

The configuration of the image data generating apparatus according to the third exemplary embodiment is the same as that of the image data generating apparatus 10A according to the second exemplary embodiment, and thus the description thereof is omitted.

Figure 13:
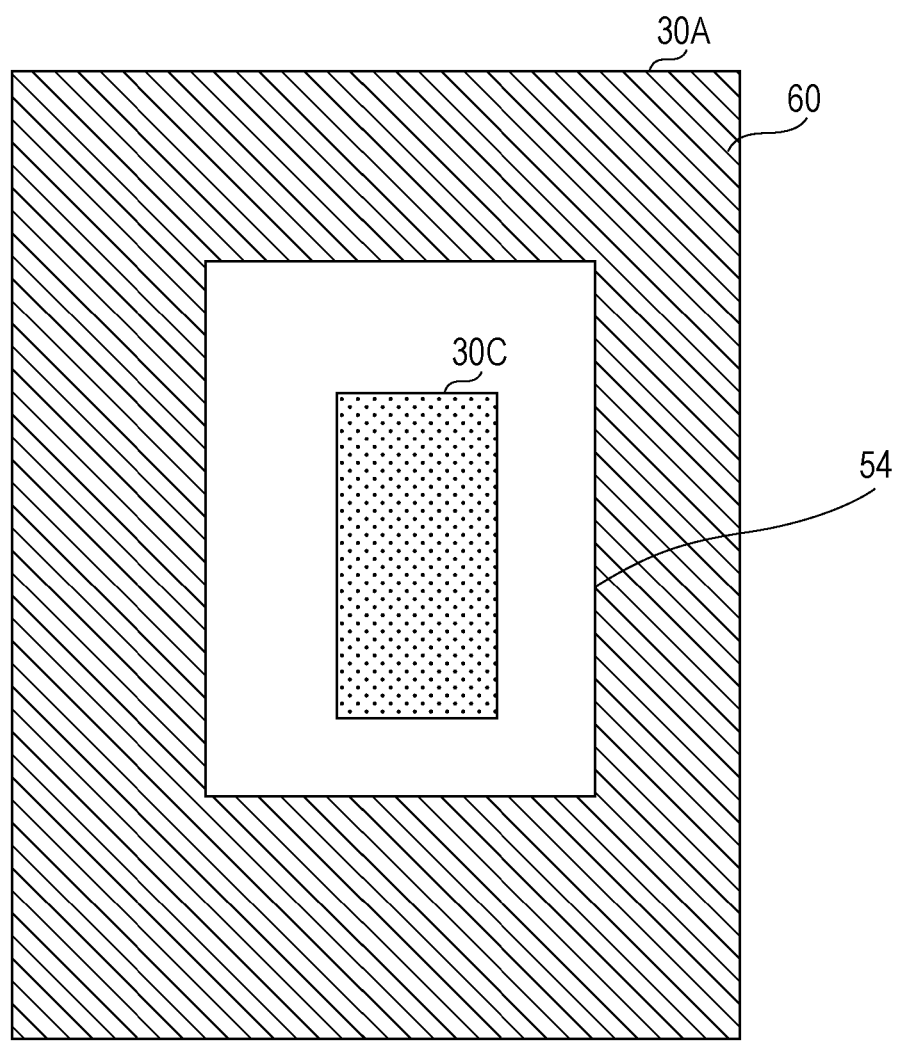
FIG. 13 is a schematic diagram illustrating an example of a candidate metallic-color region designated in at least one of a read image and a captured image according to the third exemplary embodiment.

Note that the candidate metallic-color region extracting unit 44 according to this exemplary embodiment extracts, as illustrated in FIG. 13 as an example, a region 54 including a metallic-color region 30C as a candidate metallic-color region in either of the read image 30A and the captured image 30B. The metallic-color pixel extracting unit 38 extracts, from the region 54 including the metallic-color region 30C, one or more pixels corresponding to the metallic-color region.

Figure 14:
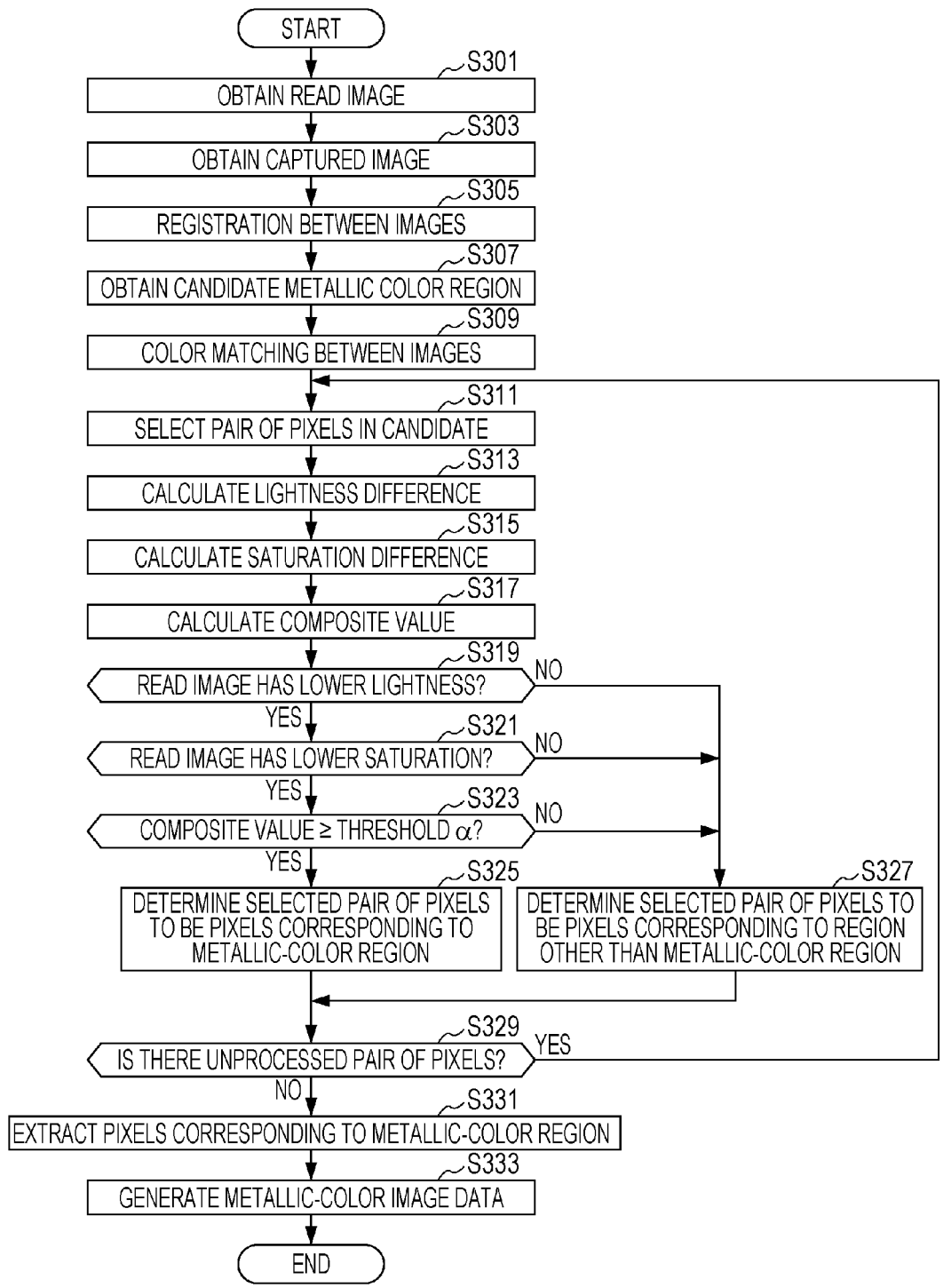
FIG. 14 is a flowchart illustrating a flow of a program of an image data generation process according to the third exemplary embodiment.

Next, a description will be given of a flow of an image data generation process executed by the CPU 14 of the image data generating apparatus 10 according to this exemplary embodiment with reference to the flowchart illustrated in FIG. 14. In this exemplary embodiment, the program of the image data generation process is executed when an execution instruction is input through the operation unit 24, but the execution timing is not limited thereto.

In step S301, as in step S101, the registration unit 32 obtains the read image 30A.

In step S303, as in step S103, the registration unit 32 obtains the captured image 30B.

In step S305, as in step S105, the registration unit 32 performs registration between the read image 30A and the captured image 30B.

In step S307, the candidate metallic-color region extracting unit 44 obtains a candidate metallic-color region designated by the user through the operation unit 24. The method for obtaining a candidate metallic-color region is not limited thereto. For example, one or more pixels whose pixel value is within a range of a pixel value of at least one of metallic colors included in metallic-color information may be extracted, and the region formed of the extracted pixels may be regarded as a candidate metallic-color region.

In step S309, as in step S107, the color matching unit 34 performs color matching between the read image 30A and the captured image 30B. In this exemplary embodiment, the color matching unit 34 performs color matching between the read image 30A and the captured image 30B by using only a range 60, which is a region obtained by removing the region 54 designate by the user through the operation unit 24 from the read image 30A and the captured image 30B. The range 60 is a hatched area illustrated in FIG. 13.

In step S311, as in step S109, the comparison value calculating unit 36 selects a pair of pixels corresponding to each other from the read image 30A and the captured image 30B.

In step S313, as in step S111, the comparison value calculating unit 36 calculates a lightness difference ΔL in the pair of pixels selected in step S311 between the read image 30A and the captured image 30B.

In step S315, as in step S113, the comparison value calculating unit 36 calculates a saturation difference ΔS in the pair of pixels selected in step S311 between the read image 30A and the captured image 30B.

In step S317, as in step S115, the comparison value calculating unit 36 calculates a composite value ΔLS of the lightness difference ΔL and the saturation difference ΔS in the pair of pixels selected in step S311 between the read image 30A and the captured image 30B.

In step S319, as in step S117, the comparison value calculating unit 36 determines whether or not the read image 30A has lower lightness than the captured image 30B. If it is determined in step S319 that the read image 30A has lower lightness than the captured image 30B (YES in S319), the process proceeds to step S321. If it is determined in step S319 that the captured image 30B has lower lightness than the read image 30A (NO in S319), the process proceeds to step S327.

In step S321, as in step S119, the comparison value calculating unit 36 determines whether or not the read image 30A has lower saturation than the captured image 30B. If it is determined in step S321 that the read image 30A has lower saturation than the captured image 30B (YES in S321), the process proceeds to step S323. If it is determined in step S321 that the captured image 30B has lower saturation than the read image 30A (NO in S321), the process proceeds to step S327.

In step S323, as in step S121, the comparison value calculating unit 36 determines whether or not the composite value ΔLS of the lightness difference and the saturation difference in the pair of pixels selected in step S311 between the read image 30A and the captured image 30B is equal to or larger than the predetermined threshold α. If it is determined in step S323 that the composite value ΔLS is equal to or larger than the predetermined threshold α (YES in S323), the process proceeds to step S325. If it is determined in step S323 that the composite value ΔLS is smaller than the predetermined threshold α (NO in S323), the process proceeds to step S327.

In step S325, as in step S123, the comparison value calculating unit 36 determines the pair of pixels selected in step S311 to be pixels corresponding to the metallic-color region.

In step S327, as in step S125, the comparison value calculating unit 36 determines the pair of pixels selected in step S311 to be pixels corresponding to a region other than the metallic-color region.

In step S329, as in step S127, the comparison value calculating unit 36 determines whether or not there is an unprocessed pair of pixels, that is, a pair of pixels that is not selected in step S311, among the pairs of pixels of the read image 30A and the captured image 30B. If it is determined in step S329 that there is an unprocessed pair of pixels (YES in S329), the process returns to step S311, where an unprocessed pair of pixels is selected, and the process from step S313 to step S327 is performed. If it is determined in step S329 that there is not an unprocessed pair of pixels (NO in S329), the process proceeds to step S331.

In step S331, as in step S129, the metallic-color pixel extracting unit 38 extracts, from the read image 30A and the captured image 30B, the pixels that have been determined to be pixels corresponding to the metallic-color region.

In step S333, as in step S131, the image data generating unit 40 generates metallic-color image data.

Accordingly, in this exemplary embodiment, one or more pixels corresponding to a metallic-color region are extracted from a region including the metallic-color region designated in either of the read image 30A and the captured image 30B.

In this exemplary embodiment, a description has been given of the case of generating image data of a metallic color designated based on metallic-color information, but the exemplary embodiment is not limited thereto. For example, in the case of generating image data of a metallic color designated based on metallic-color information, the read image 30A or the captured image 30B may be searched to determine whether or not a metallic color other than the designated metallic color exists therein. If a metallic-color region expressed by a metallic color other than the designated metallic color is extracted, the metallic color of the extracted metallic-color region may be added to the metallic-color information and image data for the metallic color may be generated. Alternatively, the metallic color of the extracted metallic-color region may be added to a metallic color that is the closest to the metallic color in the color space among the metallic colors represented by the metallic-color information. Alternatively, without the metallic color of the extracted metallic-color region being added to the metallic-color information, image data of only the designated metallic color may be generated.

In this exemplary embodiment, a description has been given of the case of extracting one or more pixels corresponding to a metallic-color region from a document having the metallic-color region expressed by a metallic color, but the exemplary embodiment is not limited thereto. For example, this exemplary embodiment is applicable to the case of extracting, from a document having a region that is drawn with ink of a large particle size and that has a coarse surface, in other words, a region that is drawn with ink causing diffuse reflection, the region drawn with the ink.

In this exemplary embodiment, a description has been given of the case of determining, for each pixel, that the pixel is a metallic-color pixel if all the above-described conditions (A) to (C) are satisfied, by using a comparison value calculated for the pixel. However, it is not limited to the case where all the conditions (A) to (C) are satisfied that the pixel is determined to be a metallic-color pixel. For example, if both the conditions (A) and (B) or both the conditions (A) and (C) are satisfied, the pixel may be determined to be a pixel corresponding to a metallic-color region.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image data generating apparatus comprising:
at least one processor configured to execute:
an extracting unit configured to extract one or more pixels corresponding to a metallic-color region expressed by a metallic color, by using lightness and saturation of a read image and lightness and saturation of a captured image, the read image being obtained by reading a document having the metallic-color region, the captured image being obtained by capturing an image of the document; and a generating unit configured to generate image data in which the one or more pixels corresponding to the metallic-color region and extracted by the extracting unit are colored in the metallic color.

2. The image data generating apparatus according to claim 1, wherein the extracting unit is configured to extract one or more pixels corresponding to the metallic-color region by using a lightness difference between the read image and the captured image and a saturation difference between the read image and the captured image.

3. The image data generating apparatus according to claim 1, wherein the extracting unit is configured to cause one or more pixels corresponding to the metallic-color region to be designated in either of the read image and the captured image, and to extract the one or more pixels corresponding to the metallic-color region by using lightness and saturation of the designated pixels.

4. The image data generating apparatus according to claim 1, wherein the extracting unit is configured to cause a region including the metallic-color region to be a designated region in either of the read image and the captured image, and to extract one or more pixels corresponding to the metallic-color region from the designated region.

5. The image data generating apparatus according to claim 1, wherein the extracting unit is configured to perform color matching between the read image and the captured image, and to extract the one or more pixels corresponding to the metallic-color region by using lightness and saturation of the read image that has undergone the color matching and lightness and saturation of the captured image that has undergone the color matching.

6. The image data generating apparatus according to claim 4, wherein the extracting unit is configured to perform color matching between the read image and the captured image by using pixel values of individual pixels included in a region other than the designated region, and to extract one or more pixels corresponding to the metallic-color region by using lightness and saturation of the read image that has undergone the color matching and lightness and saturation of the captured image that has undergone the color matching.

7. The image data generating apparatus according to claim 1, wherein the extracting unit is configured to extract, one of the one or more pixels corresponding to the metallic-color region, a pixel in which at least one of a condition that the read image has lower lightness than the captured image and a condition that the read image has lower saturation than the captured image is satisfied, and in which a length of a composite vector of a vector indicating a lightness difference between the read image and the captured image and a vector indicating a saturation difference between the read image and the captured image is equal to or larger than a predetermined threshold.

8. The image data generating apparatus according to claim 1, wherein the extracting unit is configured to extract one or more pixels corresponding to the metallic-color region expressed by a plurality of colors, for each of the plurality of colors, by using a pixel value, lightness, and saturation of each of the pixels corresponding to the metallic-color region expressed by the plurality of colors.

9. A printer comprising:
the image data generating apparatus according to claim 1; and
a printer configured to create a plate of image data generated by the image data generating apparatus and to perform printing by using the created plate such that the metallic-color region of the document is colored in the metallic color.

10. An image data generating method comprising:
extracting one or more pixels corresponding to a metallic-color region expressed by a metallic color, by using lightness and saturation of a read image and lightness and saturation of a captured image, the read image being obtained by reading a document having the metallic-color region, the captured image being obtained by capturing an image of the document; and
generating image data in which the one or more pixels corresponding to the metallic-color region and extracted in the extracting are colored in the metallic color.

11. A non-transitory computer readable medium storing a program causing a computer to execute a process, the process comprising:
extracting one or more pixels corresponding to a metallic-color region expressed by a metallic color, by using lightness and saturation of a read image and lightness and saturation of a captured image, the read image being obtained by reading a document having the metallic-color region, the captured image being obtained by capturing an image of the document; and
generating image data in which the one or more pixels corresponding to the metallic-color region and extracted in the extracting are colored in the metallic color.

* * * * *